Patented Mar. 8, 1932

1,848,981

UNITED STATES PATENT OFFICE

FREDRICK J. WALLACE, OF BROOKLYN, NEW YORK, ASSIGNOR TO ROBESON PROCESS COMPANY, OF NEW YORK, N. Y., A CORPORATION OF NEW JERSEY

ADHESIVE CEMENT

No Drawing.    Application filed September 13, 1930. Serial No. 481,810.

This invention relates to adhesive cements; and it comprises a tacky, quick drying hard cement having good moisture resisting properties and applicable as a cement for linoleum and oilcloth; said cement being made by admixture of soda casein, commercial concentrated waste sulfite liquor and clay, said cement being usually bleached somewhat with sodium acid sulfite and also usually containing a small amount of either waterglass solution or glue; a little glycerine being sometimes added to improve tack; all as more fully hereinafter set forth and as claimed.

Waste sulfite liquor from pulp making, neutralized and concentrated to about 50 per cent solids is a commercial article and is used as an adhesive. For some purposes it is admixed with clay. A pulped mixture of sulfite liquor and clay is used as a linoleum cement and is desirable for that purpose. Sometimes instead of pulping clay with the 50 per cent liquor, dry clay and dried sulfite liquor are mixed. This composition on the addition of water gives the same cement. Made in either way, the composition works well but it is susceptible of improvement. The present invention represents such an improvement.

I have found that such a composition containing some sodium caseinate in admixture together with 1 per cent or so of either waterglass or glue gives better results. The admixture is tacky and quick drying. The tack can be still further improved by addition of a little glycerin; say a percent or so. On drying the new composition, with or without the glycerin, gives a hard cement layer of good moisture resisting properties.

In a specific embodiment of the present invention the improved cement is made by dissolving 2 parts by weight of commercial casein in a solution of caustic soda or other convenient alkaline medium and adding the sodium caseinate thus formed to about 44 parts by weight of commercial neutral waste sulfite liquor of 30° Bé. The mixture is heated to 140° F. Reactions ensue producing a thick viscous mass, considerably more tacky and viscous than the original sulfite liquor. The mixture is well stirred at 140° F. and to it is added dry clay in the proportion of about 51 parts by weight. The mixture is kneaded or masticated until uniform dispersion of the clay in the vehicle is secured. The mixture at this time is a good cement. Its color can be considerably improved by the addition of 2 parts by weight of acid sodium sulfite, and this addition is customarily made. In addition to bleaching the mixture the acid sodium sulfite seems to cause some other reactions which are advantageous. To the mixture as so far described I next add 1 part by weight of commercial sirupy waterglass solution or, alternatively, 1 part by weight of any cheap animal glue. The composition produced with the waterglass is somewhat different from that produced with glue. Each has its specific advantages. Where the highest "tack" is required, the glue is better. With either composition, an addition of 1 or 2 per cent by weight of commercial glycerin is advantageous as giving increased tack. I therefore often add about this amount of glycerin to the compositions made as described. The above composition contains about 2 per cent of casein or about 1 part of casein to 11 parts of waste sulfite liquor solids. Even such minimal quantities are sufficient to greatly improve the adhesive and moisture resistant properties of the composition.

Instead of using the commercial 30° Bé. sulfite liquor, dried sulfite liquor solids can be mixed with water and the casein solution added and then the clay. Or I may mix the dried solids with dry clay, moisten the mixture with alkaline casein solution and add water. The proportion of casein to the sulfite solids may be varied within rather wide limits but one part by weight of casein to 10 or 12 parts of the sulfite solids has been found adequate to improve for the present purposes the adhesive properties of the latter to a marked degree and to increase materially the moisture resisting power of sulfite liquor cements. While addition of a small quantity either of waterglass or of glue is advantageous, it is not indispensable.

Commercial casein is soluble in a wide variety of alkaline solutions, a solution of sodium phosphate, of borax, of sodium carbonate, etc., but the solution in caustic soda on the whole is the best adapted for the present purposes. A solution of casein in borax or phosphate of sodium produces some reaction with the lime of the sulfite waste liquor, and is not quite as convenient to handle as a caustic soda solution. Instead of using casein solution, solutions, of animal or vegetable glue may be employed but are not as advantageous. An alkaline solution of rosin may be used.

What I claim is:—

1. An adhesive cement comprising a mixture of waste sulfite liquor in a concentration of about 30° Bé. with casein solution and clay dispersed in the mixture.

2. In making adhesive cement containing the solids of waste sulfite wood extract, the step which comprises incorporating in the cement one part by weight of casein to about 10 to 12 parts of said extract solids.

3. In making adhesive cement containing the solids of waste sulfite wood extract, the steps which comprise incorporating in the cement one part by weight of casein to about 10 to 12 parts of said extract solids and bleaching the cement by incorporating therein a small quantity of sodium acid sulfite.

4. The composition of claim 1 to which has been added about 1 per cent of an adhesive agent selected from a class consisting of glue and waterglass.

5. The composition of claim 1 which has been bleached by the addition of minimal amounts of acid sodium sulfite.

6. An adhesive cement comprising waste sulfite liquor, clay and casein in about the proportions by weight of 44 parts of 30° Bé sulfite liquor, 51 parts of clay and 2 parts of casein.

7. An adhesive cement comprising clay pulped with waste sulfite liquor and containing about one part of casein to about 10 to 12 parts of the waste sulfite solids.

8. An adhesive cement comprising a mixture of clay pulped with a waste sulfite wood extract and minimal quantities of a casein solution, the casein present being in sufficient quantity to improve the adhesive and moisture resistant properties of the cement.

9. The composition of claim 8 to which there is added about 1 per cent of an adhesive agent selected from a class consisting of glue and waterglass.

10. The composition of claim 8 to which there is added about 1 per cent of glue.

11. The composition of claim 8 to which there is added about 1 per cent or waterglass.

12. The composition of claim 8 to which there is added about 1 to 2 per cent of glycerin.

In testimony whereof, I have hereunto affixed my signature.

FREDRICK J. WALLACE.